Figure 1:
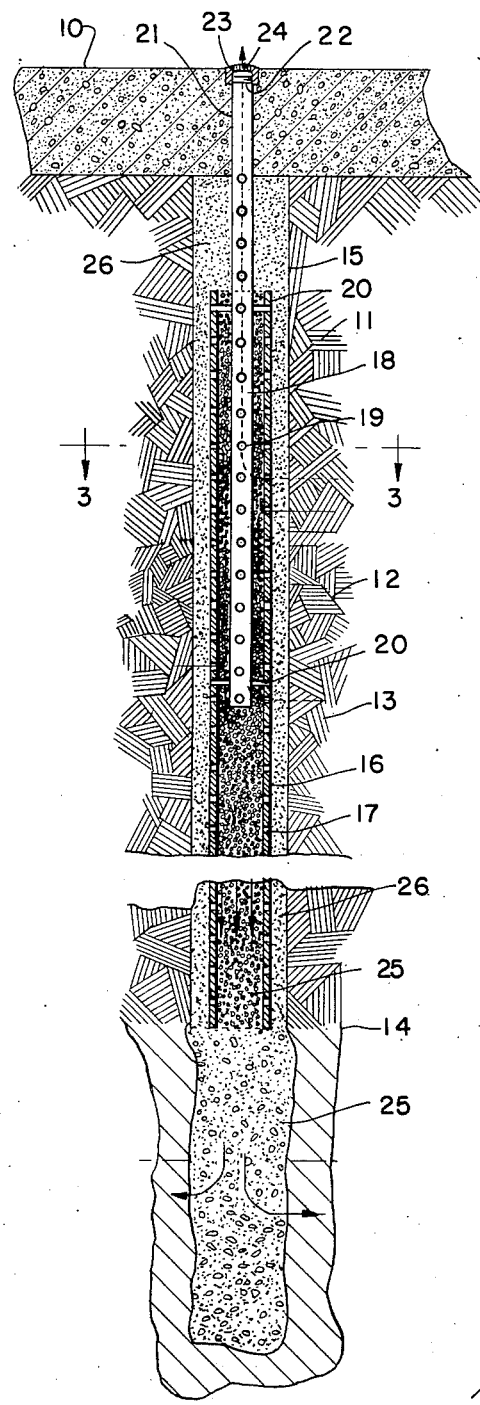

June 12, 1962    T. M. JAMESON, JR., ET AL    3,038,396
SUB-DRAIN BREATHER
Filed Dec. 23, 1959

INVENTORS
T. M. JAMESON, JR.
T. E. COLEMAN, JR

BY
ATTORNEY

3,038,396
SUB-DRAIN BREATHER
Thomas M. Jameson, Jr., Rte. 1, Easley, S.C., and
Thomas E. Coleman, Jr., Rte. 1, Mountville, S.C.
Filed Dec. 23, 1959, Ser. No. 861,476
1 Claim. (Cl. 94—33)

This invention relates to manmade structures of various kinds and to the maintenance of the same including the foundations thereof and to the drainage of water or other liquid therefrom and the venting of gas from beneath the same to the atmosphere.

The invention also relates to equipment by which water or other liquid is drained from a structure and through or from which gas is vented, and by which there is avoided the formation of cavities under gas and water tight surface layers including under pavements and the like to insure a continued stable base to protect the life and usage of the surface sealing structure.

Beneath pavements, roadways, airport runways, taxiways, ramps, parking areas and other structures, surface and sub-surface liquids and gases are trapped and pressure is produced which results in horizontal movement at various locations and areas of the earth's crust, particularly in low and flat lands which frequently contain a subsurface saturated with mythane or other gases capped by earth materials which are impervious or practically impervious.

Sub-surface water and gas under pressure prevent surface water from being absorbed by the earth resulting in perched or supported water tables near the surface of the earth's crust and above the natural or static water tables thereof. Usually the perched water table is near the underside of the surface sealing structure and it is well known that excessive water in gaseous liquid or frozen form is highly detrimental to pavements and other types of sealed surfaces which are subjected to wear. Efforts have been made to overcome undesirable liquid and gas accumulation but adequate drainage of the water and preventing of the gas has not been satisfactory.

It is an object of the invention to overcome the difficulties enumerated, to provide adequate drainage of surface and sub-surface liquids, and to dissipate or otherwise dispose of gas accumulated in certain areas economically by penetrating pressurized areas in a manner to relieve the gases upwardly and draw the perched or supported water downwardly to the normal water table and to provide for the continuous descent of the water and ascent and venting of the gases.

Another object of the invention is to enhance the usefulness of structures of various kinds resting on the earth by reducing the amount of moisture and pressure to which they are exposed thereby increasing the stability of the earth beneath such structures and decreasing deterioration and decay.

Another object of the invention is to provide a construction and arrangement of material and pipes and the prefabrication disposition and anchoring of the same within the earth in proper relation for ready economical installation and instant use to accomplish the desired end.

A further object of the invention is to provide means designed to dispose of water or liquids from on or near the surface of the earth's crust by means of more economical vertical drainage instead of horizontal drainage from large areas paved or otherwise covered in a manner to trap water and gas generated from certain organic materials or otherwise produced and which structure will actually inhale or absorb water and exhale or discharge gases.

Another object of the invention is to provide a vertical sub-drain breather capable of providing a more economical vertical drainage system instead of horizontal drainage, and where water and gas trapped in large areas and containing organic materials capable of generating gas and in which the effective distance in which the perched water is lowered is controlled by the geological formations graduations and characteristics of the soil, and the depth and pressure to the static water table and the pressure of the static water table and the location of the breather are of importance.

A further object of the invention is to provide a multi-purpose vertical sub-drain breather which will serve as a piezometer or for the measurement of the compressibility of liquids whereby the extent of its effectiveness can be determined by measuring the variations or changes of the perched water table or of the static water table, which device can serve as a static electricity grounding facility, which will permit the measuring of volume and type of gases expelled, and can be used for other purposes.

A still further object of the invention is to prevent the formation of cavities under pavements or surface sealing structure as well as a simple and inexpensive design for economic installation which precludes the necessity for expensive horizontal drainage systems and eliminates the necessity for reconstruction and redrainage of an area.

Figure 2:
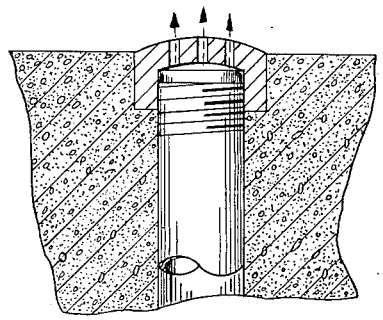

Other objects and advantages of the invention will be apparent from the following description taken in conjunction with the accompanying drawing wherein:

FIG. 1 is a vertical section illustrating one application of the invention;

FIG. 2, an enlarged fragmentary detail; and

Figure 3:
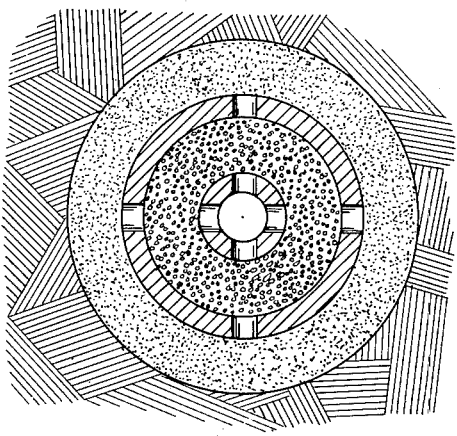

FIG. 3, a section on the line 3—3 of FIG. 1.

Briefly stated, the invention is a multi-purpose structure for providing liquid drainage directly downward and the upward venting of gas and in which a relatively large perforated pipe is supported by a smaller perforated pipe in a hole drilled in the earth and filled with a relatively coarse filtering material within the larger breather pipe and an outer casing of finer filtering material whereby gas can flow upwardly and be discharged through the coarser filtering material and water can flow by gravity and capillarity downwardly through the surrounding casing of fine filtering material.

With continued reference to the drawing, a relatively hard impervious surface layer 10 is provided which is representative of pavement, sidewalks, roadways, airport runways, taxiways, ramps, and areas used for parking and for other purposes.

Beneath this impervious surface layer of any desired material there is found a supporting layer or stratum 11 of earth, which rests upon an imprevious stratum 12, beneath which is a further layer of stratum 13, which extends downwardly to the natural or static water table 14.

Water and other liquids and gases, which accumulate in the stratum of earth beneath the structure 10 and above the impervious layer 12, are subjected to pressure and the present invention is intended to relieve this pressure while allowing the water to gravitate to the natural static water table and to vent the gases into the atmosphere so that such pressure will not be exerted equally in all directions including horizontally sufficient to cause harmful movement including the upward movement of the structure 10 and the vertical or horizontal movement of the earth therebeneath.

In the installation of the present invention to permit surface water to pass directly downward and the gases to be vented to the atmosphere a hole 15 is made in the structure 10 and through the layers or earth strata 11, 12, 13 and downwardly to the natural or static water table 14.

In the hole 15 is suspended a larger breather pipe 16 having spaced perforations 17 throughout its length and such pipe is of a length sufficient to reach from the water table 14 to slightly below the structure 10.

The larger pipe 16 is supported by a smaller perforated breather pipe 18 having perforations 19, such pipes being telescoped so that the small pipe is disposed concentrically within the upper end of the larger a sufficient distance to enable the two pipes to be properly united by means of pairs of spaced pins 20 the pins of each pair being at right angles to each other.

The small perforated pipe 18 serves to support the larger pipe and for this purpose such smaller pie is received in an opening 21 in the structure 10 of a size to grip the pipe 18 therein, the material of the structure 10 being molded about such pipe so that the pipe will be held in place. The end of the pipe 18 is provided with threads 22 for receiving a cap 23 having perforations 24 through which gases can escape to the atmosphere.

The bottom of the hole beneath the lower end of the larger perforated pipe and the interior of the larger perforated pipe including its upper portion in which the smaller pipe 18 is telescoped are provided a relatively coarse filtering filling 25 between the particles of which gas may readily pass.

About the larger perforated pipe 16 and about the upper portion of the smaller pipe above the end of the larger pipe are disposed finer particles of filtering material through which water can pass downwardly by the action of both gravity and capillarity.

It will be understood of course that where the structure 10 is already in place, it will be necessary to break an opening therethrough large enough to permit the drilling of the hole 15 and to apply the parts and then fill the opening in the structure sufficient to provide the opening 21 about the pipe 18. When the hole 15 is drilled before the structure 10 is produced all that is necessary is to have the pipe 18 project for the proper distance above the surface of the earth so that the structure 10 may be formed around it.

It will be apparent from the foregoing that a multipurpose vertical sub-drain breather is provided which will allow liquids to gravitate directly downward and gases to pass upwardly and be vented into the atmosphere.

It will be obvious to those skilled in the art that various changes may be made in the invention without departing from the spirit and scope thereof and therefore the invention is not limited by that which is illustrated in the drawing and described in the specification, but only as indicated in the accompanying claim.

What is claimed is:

The combination of a relatively large, fluid impervious surface covering having an opening therein and a multipurpose sub-drain breather for venting subsurface gases and facilitating subsurface drainage comprising a relatively small breather pipe having one end mounted in and depending from the upper portion of said opening in said covering, said breather pipe being perforated along its entire length below said covering, a perforated cap attached to the upper end of said breather pipe, a larger pipe telescoped concentrically over the other end of said breather pipe and extending through water-bearing and impervious layers of earth to the static water table, said larger pipe being perforated along its entire length with the upper end of such larger pipe terminating in spaced relation to said surface covering; spaced fasteners connecting said pipes in spaced relationship, coarse filter material within said larger pipe, fine filter material providing a casing about said larger pipe whereby liquid trapped above and between the impervious layers of earth may move by gravity and capillarity downwardly through said filter materials, and gas trapped between and below the impervious layers of earth may pass upwardly through said larger pipe and through said breather pipe and be vented to the atmosphere.

References Cited in the file of this patent

UNITED STATES PATENTS

| Re. 10,388 | Henning | Sept. 25, 1883 |
| 191,876 | Mesler | June 12, 1877 |
| 478,424 | Gueguen | July 5, 1892 |
| 1,256,830 | Rodrigo | Feb. 19, 1918 |
| 1,356,187 | Burgard | Oct. 19, 1920 |
| 1,654,601 | Records et al. | Jan. 3, 1928 |
| 2,475,635 | Parsons | July 12, 1949 |
| 2,978,033 | Pitcher et al. | Apr. 4, 1961 |

FOREIGN PATENTS

| 134,534 | Switzerland | Aug. 15, 1929 |